Feb. 22, 1944.  R. G. LE TOURNEAU  2,342,407
UNIVERSAL TRACTOR HITCH
Filed March 16, 1942

INVENTOR.
R. G. LeTourneau
BY
Webster & Webster
ATTORNEYS

Patented Feb. 22, 1944

2,342,407

UNITED STATES PATENT OFFICE 2,342,407

UNIVERSAL TRACTOR HITCH

Robert G. Le Tourneau, Peoria, Ill., assignor to R. G. Le Tourneau, Inc., a corporation of California Application March 16, 1942, Serial No. 434,823

1 Claim. (Cl. 280—33.2)

This invention is an improvement in tractor hitches, and in particular the invention resides in, and it is the principal object to provide, a unique universal tractor hitch.

The hitch is especially designed for connection between a two-wheel tractor and a wheel supported trailing implement or vehicle; the supporting wheels of the tractor and trailer being disposed adjacent their rear ends, whereby both tend to tilt down at the front end; and a further object is to provide a hitch which is longitudinally vertically rigid and secures the tractor and trailer together in a manner to normally prevent such tilting action, while at the same time allowing of lateral rolling or rocking movement of the tractor or trailer relative to each other as the same pass over uneven ground, and regardless of the angle of draft.

A further object of the invention is to provide a universal tractor hitch which includes a rigid draft member secured on and projecting forwardly in normally rigid relation from the trailer, and a rigid draft element rotatably mounted on and projecting rearwardly from the tractor, said draft element being rotatable about its longitudinal axis; adjacent ends of said draft member and draft element being connected together for relative swinging or articulating movement in a substantially horizontal plane, but inflexible in a longitudinally vertical plane.

An additional object of the invention is to provide a universal tractor hitch which comprises an upstanding post, a rigid element fixed on and projecting forwardly from the post, a bearing unit in which said forwardly projecting element is journaled for rotation about its longitudinal axis, and which unit is adapted for connection with a tractor, bearings supporting the post for rotation, and a draft member fixed in connection with said bearings and projecting rearwardly from the post, said draft member at its rear end being arranged for connection with the forward end of a trailer.

It is also an object of the invention to provide a universal tractor hitch which is rugged and compact, and one which will require little service or repair.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
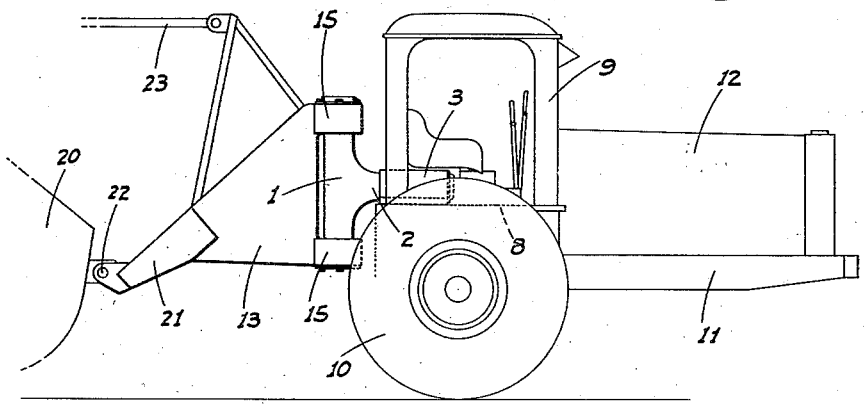
Figure 1 is a side elevation of the universal tractor hitch as connected between a two-wheel tractor and a scraper of the type which is wheel supported adjacent its rear end.
Figure 2:
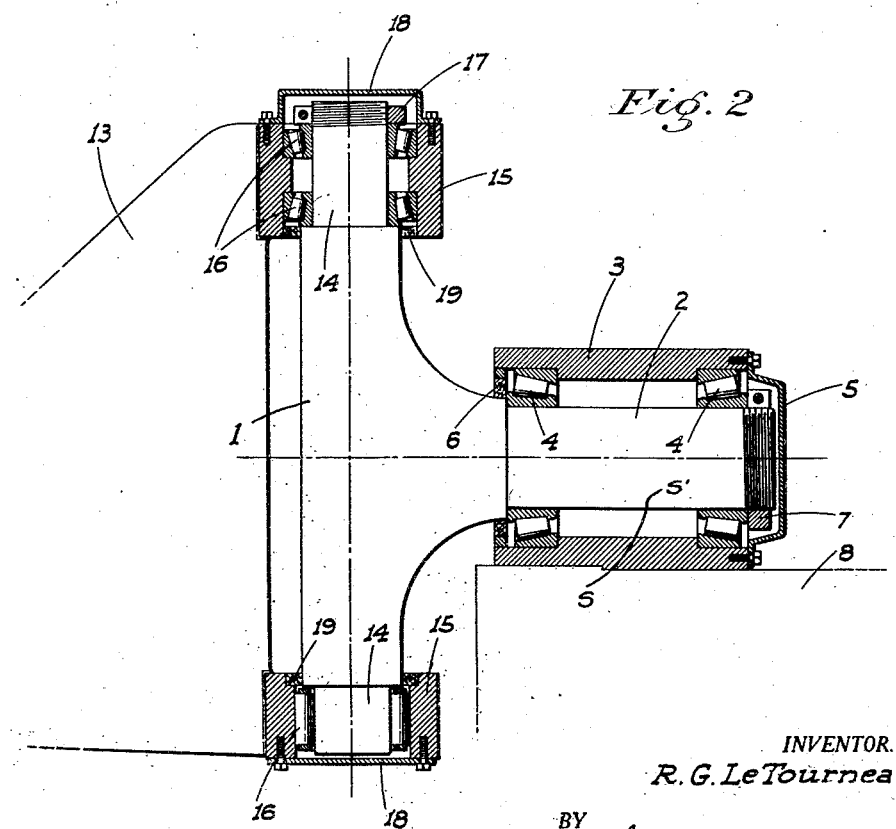
Figure 2 is an enlarged sectional elevational of the hitch.

Referring now more particularly to the characters of reference on the drawing, the numeral 1 indicates a heavy duty vertical post 1 including a relatively long horizontal spindle 2 formed therewith and projecting forwardly intermediate the ends of said post. The spindle 2 is journaled in a bearing sleeve or box 3 by means of combination annular and thrust bearings 4, for rotation about its longitudinal axis. At the forward end the sleeve 3 is fitted with a dust cap 5 and suitable sealing means 6 extends between the spindle and the rear end of the bearing sleeve 3. An adjustment or bearing take-up nut 7 is threaded on the forward end of spindle 2; access to this take-up nut being had by removal of dust cap 5.

The bearing sleeve 3 is adapted to be fixed in connection with a rear portion of the tractor, and in the present instance is shown as mounted on the rear deck or transmission housing 8 of a two-wheel tractor 9; this tractor being of the type which includes a pair of transversely spaced supporting wheels 10 adjacent its rear end and a forwardly projecting engine supporting frame 11, such frame, and the supported engine within the hood 12, overhanging the ground ahead of wheels 10, and being unsupported at the front end.

A vertically disposed, web-like tongue 13 projects rearwardly from the post, the forward edge of said tongue being substantially parallel to post 1 and adjacent thereto; the web at its forward edge being substantially the same height as the post. At the upper and lower ends thereof, post 1 is formed with vertical stub or end spindles 14, which project into upper and lower bearing bosses 15, which are formed rigid with and project forwardly in axial alinement from the upper and lower ends of the web-like tongue 13. Bearings 16 are fitted in bosses 15 and cooperate with the stub or end spindles 14. The bearings within the upper boss 15 are of combination annular and thrust type; bearing adjustment being effected by means of an adjustment nut 17 threaded on the corresponding spindle 14. Dust caps 18, as well as seal rings 19, prevent access of foreign matter to the bearings 16.

At its rear end, the tongue 13 is connected in normally rigid relation with the trailing implement or vehicle. In this instance, the trailer is shown diagrammatically as a carry-type scraper, indicated generally at 20 and which is conventionally supported at its rear end by transversely spaced wheels (not shown). The tongue 13 is connected with the front end of the scraper by means of a wishbone yoke 21 fixed to the tongue and pivoted at transversely spaced points to the scraper, as at 22; the scraper including a conventional tilt control mechanism diagrammatically indicated at 23, and which normally maintains the tongue 13 and scraper 21 in rigid relation.

The above described tractor hitch is operative to maintain the two-wheel tractor in supported relation and against forward and downward tilting action; to permit the tractor or trailer to roll or rock independent of the other as uneven ground is traversed, and to transmit to the tractor wheels the downward force or leverage exerted by the trailer at its front end so as to increase the traction of said wheels to a substantial degree and which traction is likewise enhanced by weight and leverage of the forwardly projecting ground-overhanging engine and its supporting frame. It will be noted that the deck 8 is formed with a shallow step intermediate the ends of box 3 and providing a forwardly facing shoulder S and that the under side of said box is formed with a matching rearwardly facing shoulder $S^1$. In this manner, when the draft unit or hitch is under tension, the securing means of box 3, such as bolts, are relieved of shearing strains.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A draft unit for connection between a trailer and tractor, the latter having a rear-end deck; the unit comprising a member mounted on the trailer for relative rotation about a vertical axis, a horizontal spindle projecting forwardly from the member, and a bearing box in which said spindle is journaled and held against axial movement, the box overhanging the tractor deck and being secured thereon; the under side of said box being formed intermediate its ends with a shallow transverse step providing a rearwardly facing shoulder and the deck having a matching forwardly facing shoulder engaging the box shoulder whereby when the draft unit is under tension, the box securing means is relieved of strain.

ROBERT G. LE TOURNEAU.